(12) United States Patent
Uskela (10) Patent No.: US 7,289,808 B1
(45) Date of Patent: Oct. 30, 2007

(54) INTER-SYSTEM HANDOVER

(75) Inventor: Sami Uskela, Helsinki (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/744,612

(22) PCT Filed: Jul. 27, 1999

(86) PCT No.: PCT/IB99/01412

§ 371 (c)(1),
(2), (4) Date: Mar. 9, 2001

(87) PCT Pub. No.: WO00/07402

PCT Pub. Date: Feb. 10, 2000

(30) Foreign Application Priority Data

Jul. 28, 1998 (GB) ................................ 9816447.8

(51) Int. Cl.
*H04Q 7/20* (2006.01)
*G08C 17/00* (2006.01)

(52) U.S. Cl. ...................... 455/436; 455/437; 455/438; 455/439; 370/311

(58) Field of Classification Search ................ 455/426, 455/432.1–432.3, 433–434, 436–451, 422.1, 455/466, 458, 517, 524–525, 560–561, 550.1, 455/556.2; 370/328–336, 310.2; 380/272
See application file for complete search history.

(56) References Cited

U.S. PATENT DOCUMENTS

| | | | | |
|---|---|---|---|---|
| 4,737,978 A | * | 4/1988 | Burke et al. ................ | 455/438 |
| 5,659,598 A | * | 8/1997 | Byrne et al. ................ | 455/436 |
| 5,682,416 A | * | 10/1997 | Schmidt et al. ............. | 455/436 |
| 5,845,211 A | * | 12/1998 | Roach, Jr. ................... | 455/436 |
| 5,940,762 A | * | 8/1999 | Lee et al. .................... | 455/442 |
| 5,943,333 A | * | 8/1999 | Whinnett et al. ........... | 370/345 |
| 5,974,036 A | * | 10/1999 | Acharya et al. ............. | 370/331 |
| 6,081,705 A | * | 6/2000 | Houde et al. ............... | 455/411 |
| 6,081,714 A | * | 6/2000 | Wakizaka .................... | 455/437 |
| 6,115,608 A | * | 9/2000 | Duran et al. ................ | 455/436 |
| 6,212,389 B1 | * | 4/2001 | Fapojuwo .................... | 455/436 |
| 6,230,013 B1 | * | 5/2001 | Wallentin et al. ........... | 455/436 |
| 6,353,626 B1 | * | 3/2002 | Sunay et al. ................ | 375/130 |
| 6,449,305 B1 | * | 9/2002 | Menich et al. .............. | 375/141 |
| 6,470,188 B1 | * | 10/2002 | Ohtani et al. ............... | 455/503 |
| 6,473,411 B1 | * | 10/2002 | Kumaki et al. ............. | 370/331 |
| 6,510,146 B1 | * | 1/2003 | Korpela et al. ............. | 370/332 |
| 2001/0022615 A1 | * | 9/2001 | Fernandez et al. ......... | 348/143 |

FOREIGN PATENT DOCUMENTS

| | | |
|---|---|---|
| EP | 0 695 104 A2 * | 1/1996 |
| EP | 0695104 A2 | 1/1996 |
| EP | 0700167 A1 | 3/1996 |
| GB | 2 225 512 A * | 5/1990 |
| GB | 2225512 A | 5/1990 |
| GB | 2 288 301 A * | 10/1995 |
| GB | 2293294 A | 3/1996 |

* cited by examiner

*Primary Examiner*—Meless Zewdu
(74) *Attorney, Agent, or Firm*—Perman & Green, LLP (57) ABSTRACT

A method for performing handover of a mobile station communicating in a first call via a first network to communication in a second call via a second network, comprising: generating a request for handover; establishing the second call between the first network and the mobile station via the second network; and transferring data communication between the mobile station and the first network from the first call to the second call.

28 Claims, 6 Drawing Sheets

FIG. 7 ial application was published under PCT Article 21(2) in English as WO Publication No. WO 00/07402.

INTER-SYSTEM HANDOVER

This application claims the benefit of the earlier filed International Application No. PCT/IB99/01412, International Filing Date, 27 Jul. 1999, which designated the United States of America, and which international application was published under PCT Article 21(2) in English as WO Publication No. WO 00/07402.

FIELD OF THE INVENTION

This invention relates to a system of handover for mobile stations, for example in a cellular radio telecommunications network.

BACKGROUND OF THE INVENTION

Figure 1:
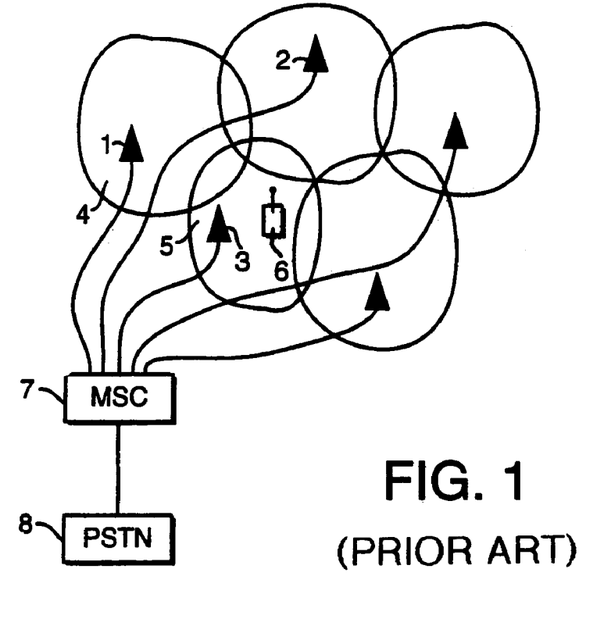
FIG. 1 shows schematically the configuration of a typical cellular radio telecommunications network.

FIG. 1 shows schematically the configuration of a typical cellular radio telecommunications network. The network comprises a number of base-stations (BSs) 1, 2, 3 etc. Each base-station has a radio transceiver capable of transmitting radio signals to and receiving radio signals from the area of a cell 4, 5 etc. next to the base-station. By means of these signals the base-station can communicate with a mobile station (MS) 6 in that cell, which itself includes a radio transceiver. Each base station is connected to a mobile system controller (MSC) 7, which is linked in turn to the public telephone network 8. By means of this system a user of the MS 6 can establish a telephone call to the public network 8 via the BS in whose cell the MS is located.

The location of the MS could be fixed (for example if it is providing radio communications for a fixed building) or the MS could be moveable (for example if it is a hand portable transceiver or "mobile phone"). When the MS is moveable it may move between cells of the cellular radio system. As it moves from one cell (the "old cell") to another cell (the "new cell") there is a need to hand it over from communication with the BS of the old cell to the BS of the new cell without dropping the call due to a break in communications between the mobile station and the network. This process is known as handover. A need can also arise to hand over a MS whose location is fixed, for example if atmospheric conditions affect its communications with the old BS and call quality can be improved by handing it over to another BS or if there is a need to free up capacity of the old BS.

In a conventional cellular radio system handover is controlled automatically by the MSC. Handover can be initiated by the MS or be network dependent, for example, on the quality of the signalling between the MS and the old and new BSs.

Figure 2:
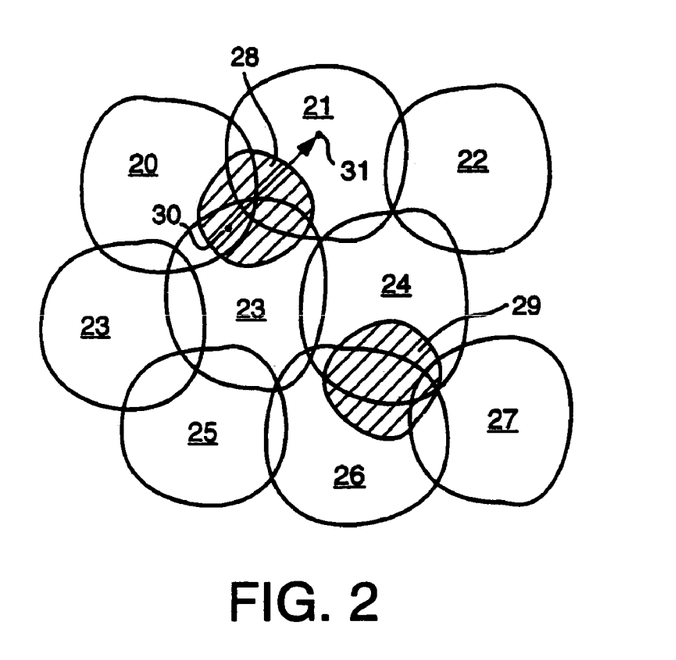
FIG. 2 shows coverage of two overlapping telecommunications networks.

When a new cellular network is being introduced it can take some time to install all the base-stations and associated apparatus. Therefore, there is a delay before the new network provides full geographical coverage. FIG. 2 illustrates the situation: an existing cellular network provides full geographical coverage by means of cells 20-27 but the new cellular network provides incomplete geographical coverage by means of only cells 28 and 29. This presents a significant commercial problem for the operator of the new network. If the new network is launched for use before its geographical coverage is complete then customers will be dissatisfied by its inferior coverage to the old network. However, the cost of the infrastructure of the new network is high and no return can be gained on it until it is in use.

It has been proposed to tackle this problem by allowing mobile stations using the new network to be handed over to cells of the old network when they move outside the coverage of the new network. For instance, when a mobile station moves from 30 to 31 in FIG. 2 it could be handed over from the base station of cell 28 (in the new network) to that of cell 21 (in the old network). However, the base-stations of cells 28 and 21 are in different networks and are therefore not linked by a common MSC, so conventional handover processes cannot be used. One solution to this could be to modify the old network to allow it to support inter-network handover. However, modifying the old network would be expensive and inconvenient.

There is therefore a need for a new method for handover between two telecommunications networks.

SUMMARY OF THE INVENTION

According to the present invention there is provided a method for performing handover of a mobile station communicating in a first call via a first network to communication in a second call via a second network, comprising: generating a request for handover; establishing the second call between the first network and the mobile station via the second network; and transferring data communication between the mobile station and the first network from the first call to the second call.

The method preferably also comprises the step of releasing the first call after data communication between the mobile station and the first network has been transferred from the first call to the second call. The said data communication is suitably communication of user data such as speech or other communication information.

The request for handover may be generated by the mobile station or the first network. Preferably the one of those entities generating the request transmits a message to the other of those entities to request the handover.

The mobile station may originate the second call. In that case it is preferred that the first network transmits to the mobile station data indicating an identification for the handover operation. Subsequently the mobile station may transmit to the second network data indicating that identification; and when the second call has been established the second network may transmit to the first network data indicating that identification. In response to receiving the identification in this way the first network may initiate transfer of the data communication from the first call to the second call.

The first network may originate the second call. In that case it is preferred that the mobile station transmits its identification in the second network (e.g. its MSISDN in the second network) to the first network and the first network uses that identification in originating the second call.

The geographical coverage of the second network may suitably be greater than that of the first network, at least in the region of the mobile station's location.

The first and second networks may suitably be cellular telephone networks. The mobile station may suitably be capable of communicating by radio with the first and second networks. The first and second calls may both be telephone calls. The mobile station may, for example, be a radio telephone.

BRIEF DESCRITPTION OF THE DRAWINGS

The present invention will now be described by way of example with reference to the accompanying drawings, in which.

DETAILED DESCRIPTION OF THE PREFERRED EMBODIMENTS

Figure 3:
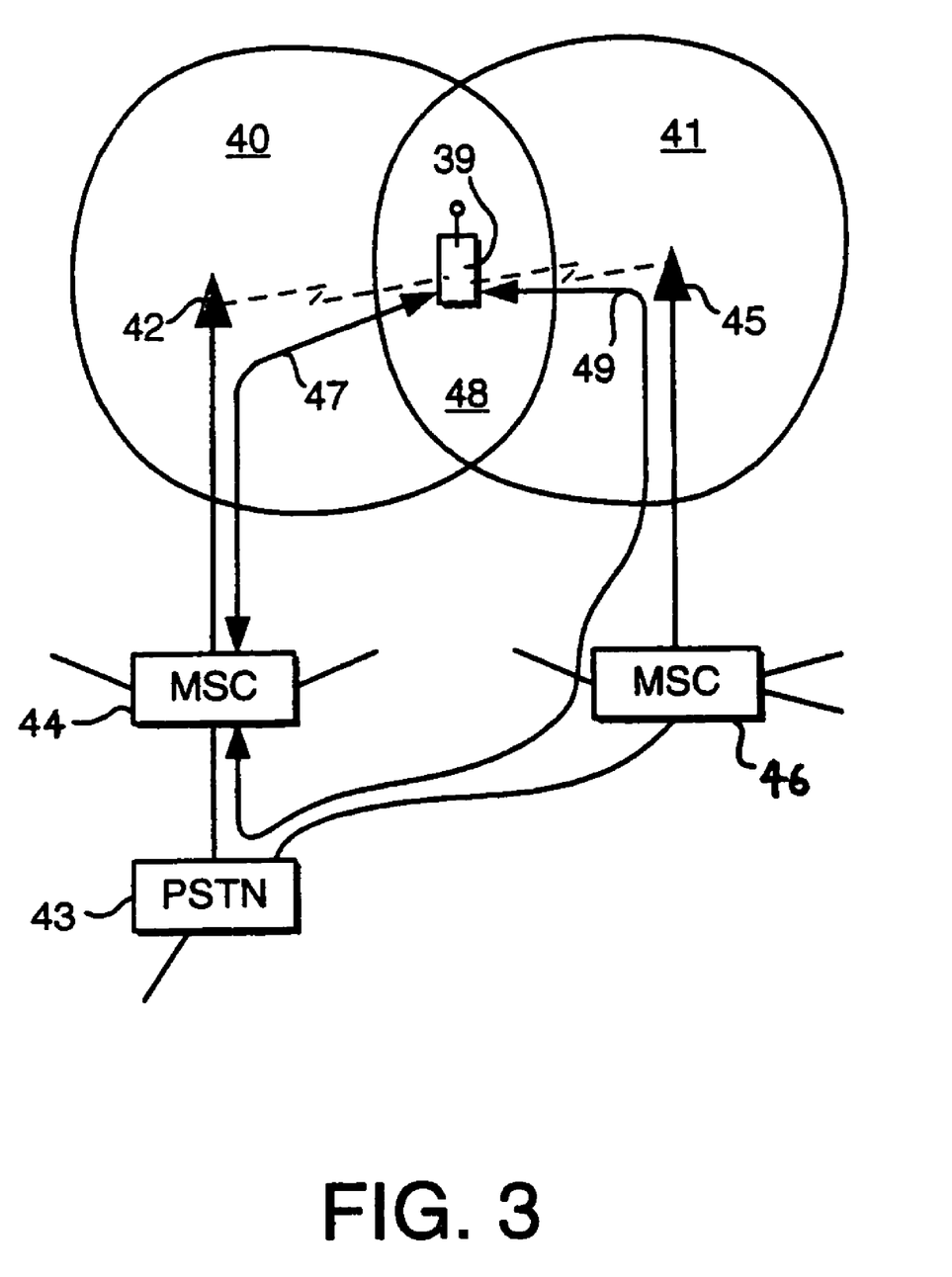
FIG. 3 illustrates a handover process.

The handover process illustrated in FIG. 3 allows a mobile station 39 to be handed over between two telecommunications networks. In this illustration the mobile station moves from cell 40 to cell 41. Cell 40 is the cell of base-station 42 in network NW1. Base-station 42 is connected to the public telephone network 43 via an MSC 44 of network NW1. Cell 41 is the cell of base-station 45 in network NW2. Base-station 45 is connected to the public telephone network 43 via an MSC 46 of network NW2.

Initially the MS 39 is in communication with BS 42 and MSC 44 by means of a call 47 using the protocol of network NW1. When the MS moves away from the BS 42 it reaches a zone 48 where cells 40 and 41 overlap and the MS can communicate with both BS 42 and BS 45. Whilst the MS is in that overlap zone 48 it can be handed over from BS 42 to BS 45. The handover can be initiated by the mobile station, for example if it detects a greater signal strength or a lesser error rate for communications with BS 45 than with BS 42. Alternatively the handover can be initiated by the network, for example if it detects that communications between base-station 42 and mobile station 39 have a signal strength that falls below or an error rate that rises above pre-set thresholds, or if it is desired to free up capacity of base station 42 by handing the MS 39 off to BS 45.

The mobile station is capable of maintaining a call with a base-station of network NW1 at the same time as maintaining a call with a base-station of network NW2. Dual band mobile stations of this general type are well-known. Such mobile stations can make the normal location updates to both networks.

Once handover has been initiated, by the mobile station or the network, a second call 49 is established between the mobile station 39 and the MSC 46. This call passes over network NW1 via the base station 45. Meanwhile the original call 47 is maintained. Thus at this stage there are two calls in progress at once from the mobile switching centre of network NW2 to the mobile station 39. Once the second call 49 has been established network NW1 routes the data formerly being carried by the original call 47 over the second call 49. Then the original call 45 can be released. The mobile station 39 then communicates with the mobile switching centre 44 of the network NW1 to which it was originally connected, only via a base station of network NW2. Thus the mobile station has in effect been handed off to network NW2, although the call is still routed through the MSC 44 of network NW1. If the call passed onward to the public telephone network 43 from the MSC 44 (rather than to another mobile station in network NW1, for example) then this arrangement could be inefficient. To overcome this there could be Provided means for optimising the routing of the call after handover has taken place, for example by routing the call to the public telephone network directly from the MCS of network NW2 rather than via that of NW1.

FIGS. 4 to 7 illustrate possible ways of implementing this type of handover.

Figure 4:
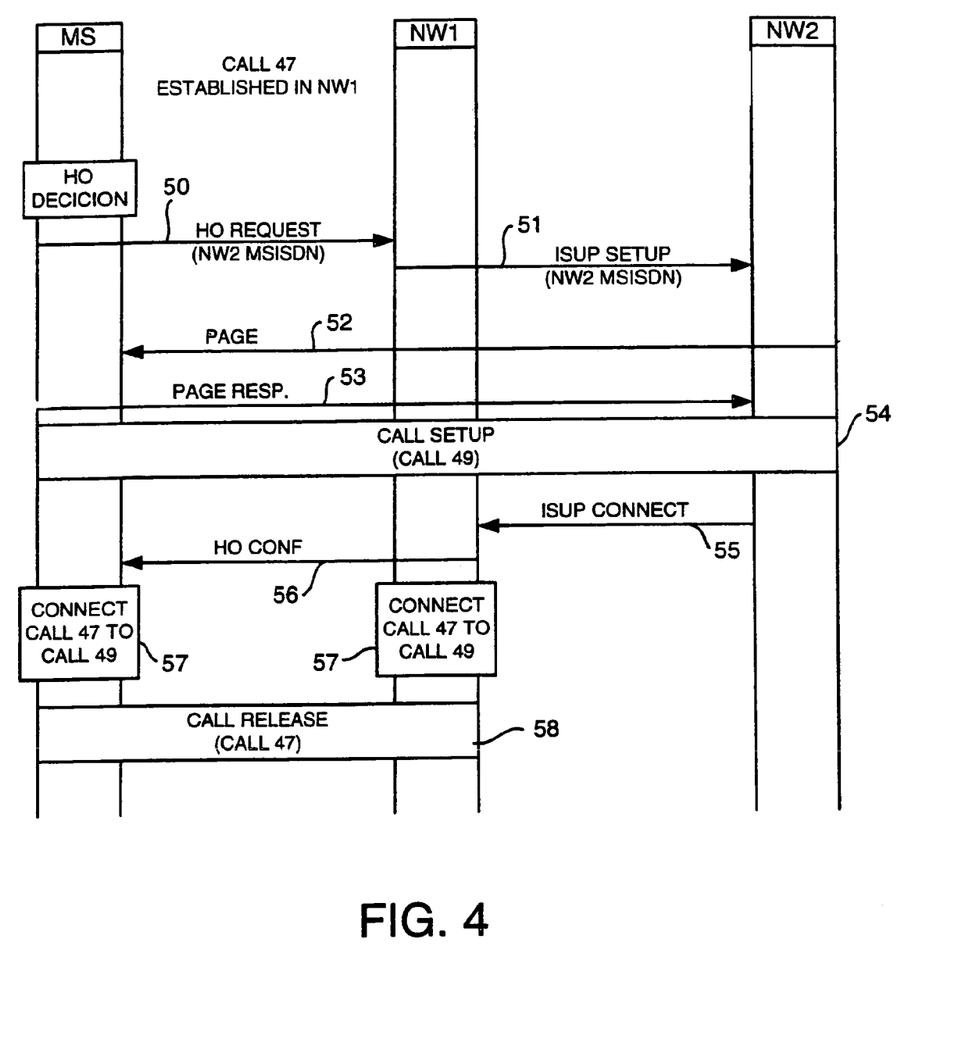
FIG. 4 illustrates information flow for a mobile station triggered handover with a mobile terminated call.

FIG. 4 shows the signalling used for a mobile station triggered handover when mobile terminated calls are used. Initially the mobile station is in communication with network NW1 over call 47. When the MS 39 discovers that inter-system handover is required it sends a handover request 50 to the MSC 44 of network NW1. This handover request includes information that defines the identification number of the mobile station (its MSISDN) in network NW2. Then the MSC 44 of network NW1 makes a new call (call 49) to that MSISDN number. This could be done using ISUP or TUP signalling. A request 51 for this new call reaches network NW2 which sets up the call with the mobile MS 39 in the usual way for a mobile terminated call—for example by means of page and page_response messages 52, 53. The new call 49 is then set up (at 54). When the new call 49 has been set up network NW2 returns the normal message (e.g. ISUP_connect message 55) to indicate this fact to the network NW1 that originated the call 49. The network NW1 can then issue a message (indicated as a handover_confirmation message 56) to the mobile station to confirm that handover can now be made. Then the mobile station and the network NW1 connect call 47 to call 49 (at 57) so that user data that would formerly have been carried over call 47 is carried instead over call 49. Once all user data is being carried over call 49 then call 47 can be released (at 58). Handover is then complete.

Figure 5:
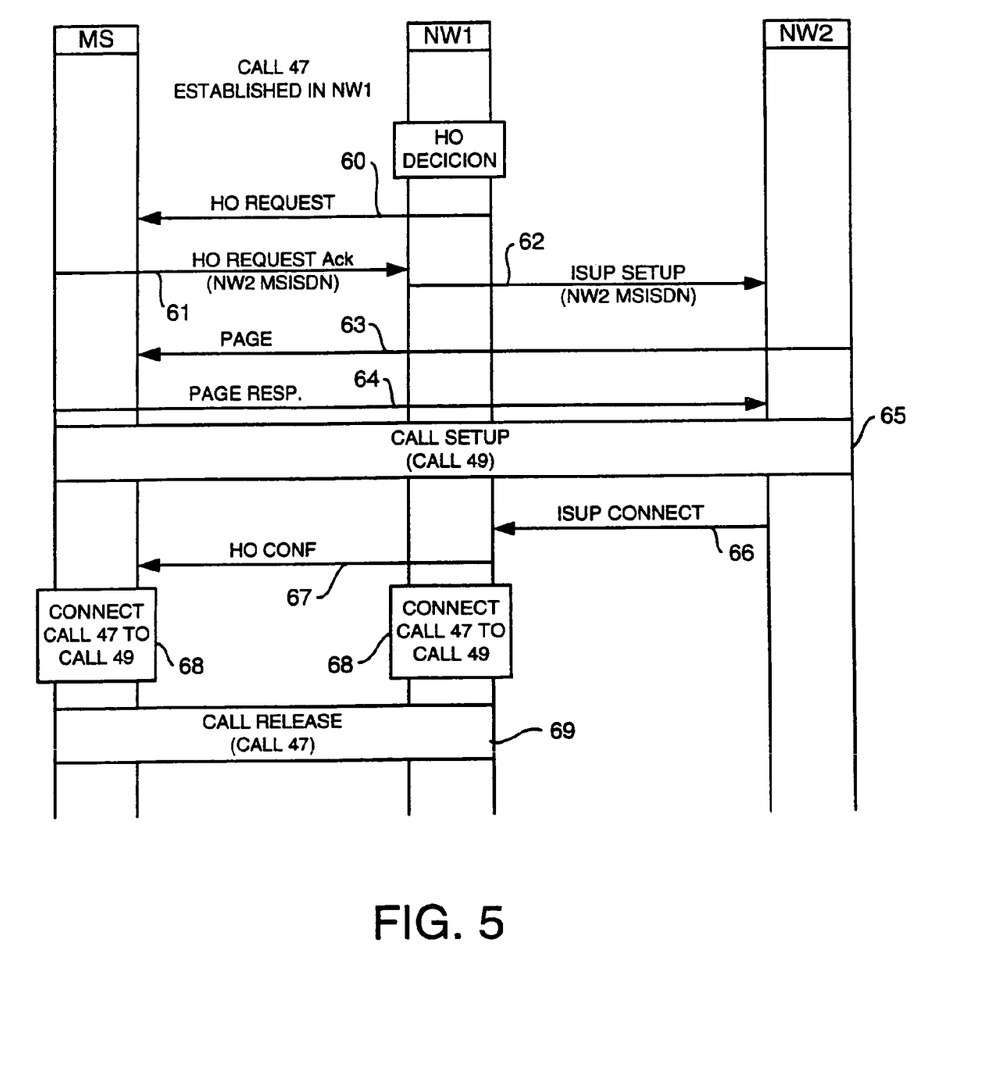
FIG. 5 illustrates information flow for a network triggered handover with a mobile terminated call.

FIG. 5 shows the signalling used for a network triggered handover when mobile terminated calls are used. Initially the mobile station is in communication with network NW1 over call 47. When the network NW1 discovers that inter-system handover is required it sends a handover request 60 to the mobile station 39. In response to this handover request the mobile station 39 returns an acknowledgement signal (indicated as handover_request_acknowledgement signal 61) that includes information that defines the identification number of the mobile station (its MSISDN) in network NW2. Then the handover proceeds as described above in the scenario of FIG. 4 following receipt by network NW1 of the handover request 50. The MSC of network NW1 makes a new call (call 49) to that MSISDN number. This could be done using ISUP or TUP signalling. A request 62 for this new call reaches network NW2, which sets up the call with the mobile MS 39 in the usual way for a mobile terminated call—for example by means of page and page_response messages 63, 64. The new call 49 is then set up (at 65). When the new call 49 has been set up network NW2 returns the normal message (e.g. ISUP_connect message 66) to indicate this fact to the network NW1 that originated the call 49. The network NW1 can then issue a message (indicated as a handover_confirmation message 67) to the mobile station to confirm that handover can now be made. Then the mobile station and the network NW1 connect call 47 to call 49 (at 68) so that user data that would formerly have been carried over call 47 is carried instead over call 49. Once all user data is being carried over call 49 then call 47 can be released (at 69). Handover is then complete.

Figure 6:
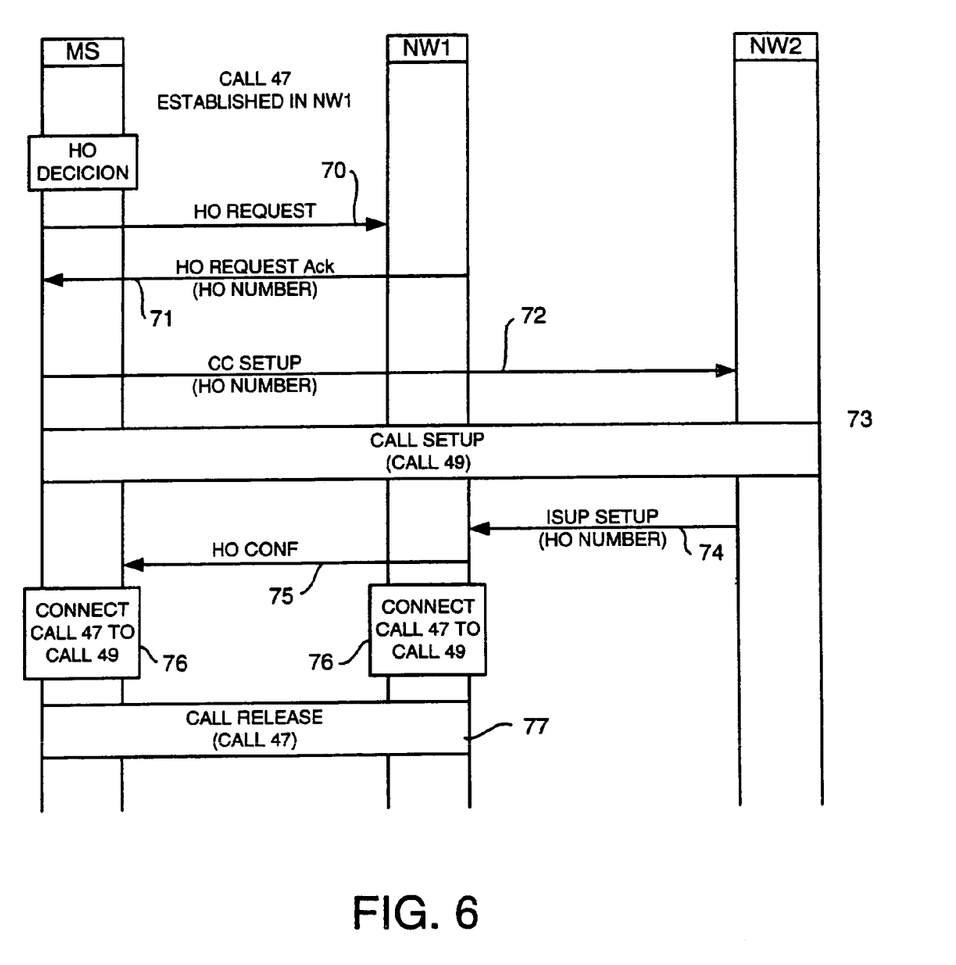
FIG. 6 illustrates information flow for a mobile station triggered handover with a mobile originated call.

FIG. 6 shows the signalling used for a mobile station triggered handover when mobile originated calls are used. Initially the mobile station 39 is in communication with network NW1 over call 47. When the MS 39 discovers that inter-system handover is required it sends a handover request 70 to the MSC of network NW1. The network NW1 replies with a handover request acknowledgement message 71 to the mobile station. This handover request acknowledgement message includes information that defines a handover number assigned by the network NW1 to this handover operation. The mobile station 39 then makes a new call (call 49) to the network NW2, for example by means of a CC_setup message 72. In connection with that call the mobile station reports to the network NW2 the handover number that it has been given. This could be done by means of the CC_setup message itself. The new call 49 is then set up (at 73). When the new call 49 has been set up network NW2 returns a message (e.g. ISUP_connect message 74) to indicate this fact to the network NW1 that originated the new call 49. As part of this message or otherwise the network NW2 also reports to the network NW1 the handover number associated with the new call. On receiving this handover number from the network NW2 the network NW1 knows that the handover can be completed by means of the new call 49. The network NW1 can then issue a handover confirmation message 75 to the mobile station to confirm that handover can now be made. Then the mobile station and the network NW1 connect call 47 to call 49 (at 76) so that user data that would formerly have been carried over call 47 is carried instead over call 49. Once all user data is being carried over call 49 then call 47 can be released (at 77). Handover is then complete.

Figure 7:
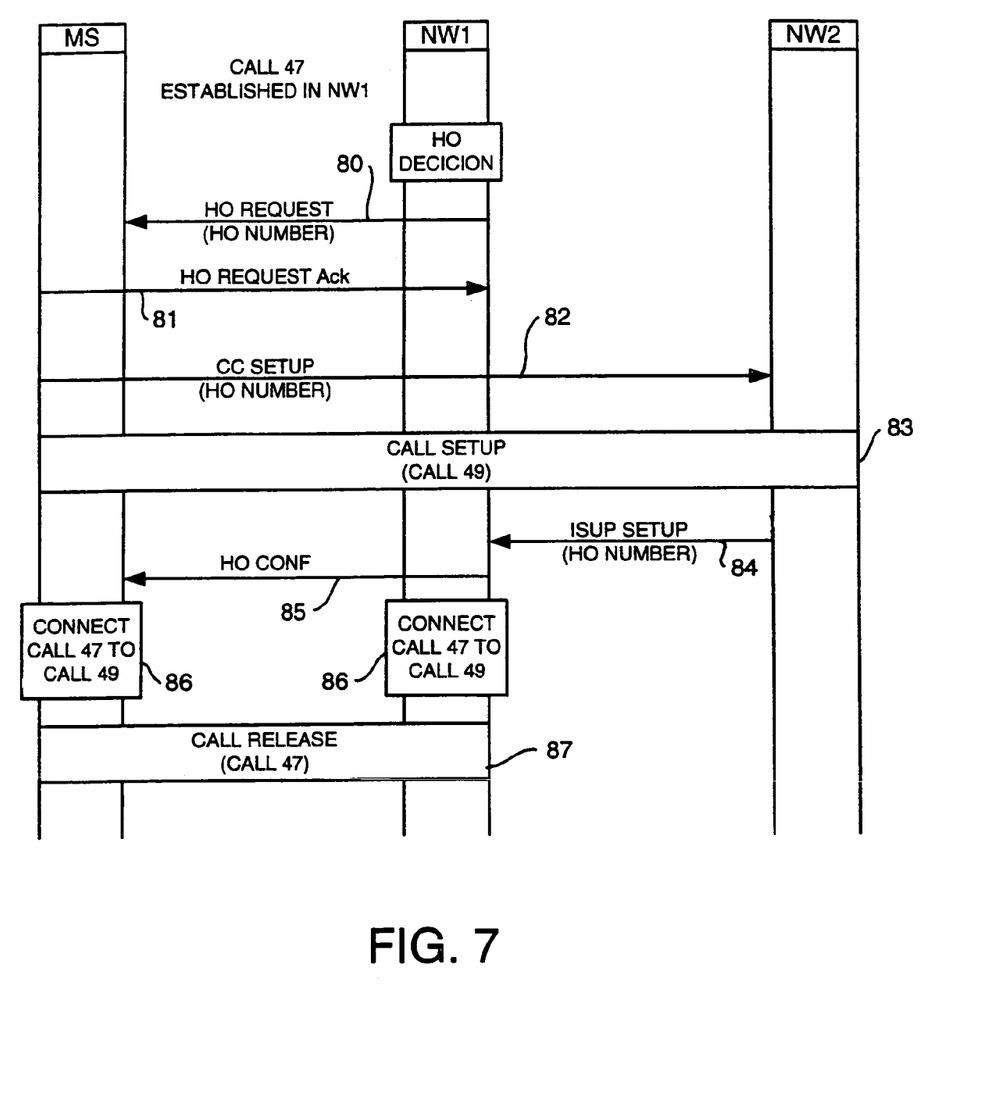
FIG. 7 illustrates information flow for a network triggered handover with a mobile originated call.

FIG. 7 shows the signalling used for a network triggered handover when mobile originated calls are used. Initially the mobile station 39 is in communication with network NW1 over call 47. When the network NW1 discovers that inter-system handover is required it sends a handover request 80 to the mobile station 39. This handover request includes information that defines a handover number assigned by the network NW1 to this handover operation. The mobile station 39 then replies with a handover request acknowledgement message 81 to the network NW1 and makes a new call (call 49) to the network NW2, for example by means of a CC_setup message 82. In connection with that call the mobile station reports to the network NW2 the handover number that it has been given. This could be done by means of the CC setup message itself. The new call 49 is then set up (at 83). When the new call 49 has been set up network NW2 returns a message (e.g. ISUP_connect message 84) to indicate this fact to the network NW1 that originated the new call 49. As part of this message or otherwise the network NW2 also reports to the network NW1 the handover number associated with the new call. On receiving this handover number from the network NW2 the network NW1 knows that the handover can be completed by means of the new call 49. The network NW1 can then issue a handover confirmation message 85 to the mobile station to confirm that handover can now be made. Then the mobile station and the network NW1 connect call 47 to call 49 (at 86) so that user data that would formerly have been carried over call 47 is carried instead over call 49. Once all user data is being carried over call 49 then call 47 can be released (at 87). Handover is then complete.

One situation where this handover process could usefully be implemented is when a mobile station is being handed over from a network with incomplete geographical coverage to one with greater geographical coverage. For example, the network NW1 from which the mobile station is being handed over could be a localised network or a network in the course of construction; the network NW2 to which the mobile station is being handed over could be a more extensive or more established network. The networks could be of different core network types. One specific example is where one of the networks (e.g. network NW1) is a 2G network such as a PDC network and the other network (e.g. network NW2) is a 3G network such as an IMT-2000 network.

In the case of both mobile terminated calls (FIGS. 4 and 5) and mobile originated calls (FIGS. 6 and 7) there is no need for any change from conventional signalling in the network to which the mobile station is being handed over. This makes the handover method very convenient to implement since there is no need to modify the existing network. Thus only one of the networks needs specifically to support the handover method. In the case of mobile originated calls (FIGS. 6 and 7), since the handover number could be an E.164 or E.163 number, to which the mobile station is calling, conventional signalling in network NW2 can support the return of that number to the network NW1.

When the network NW2 has a greater coverage than network NW1 it is likely that the need to hand over from network NW1 to network NW2 will be more common than the need to hand over from network NW2. Thus any inability to handover easily from network NW2 to network NW1 (i.e. in the opposite direction from that described in detail above), for example because such handover is not supported by network NW2, may not be significant.

The present invention may include any feature or combination of features disclosed herein either implicitly or explicitly or any generalisation thereof, irrespective of whether it relates to the presently claimed invention. In view of the foregoing description it will be evident to a person skilled in the art that various modifications may be made within the scope of the invention.

What is claimed is:

1. A method for performing handover of a mobile station communicating in a first call via a first network to communication in a second call via a second network, comprising:
    generating a request for handover;
    establishing the second call between the first network and the mobile station via the second network the second call being originated by the mobile station;
    transferring data communication between the mobile station and the first network from the first call to the second call; and
    the first network transmits data to the mobile station indicating an identification for the handover, information that defines a handover number assigned by the first network to the handover.

2. A method as claimed in claim 1, comprising the step of releasing the first call after data communication between the mobile station and the first network has been transferred from the first call to the second call.

3. A method as claimed in claim 1, wherein the mobile station generates the request for handover.

4. A method as claimed in claim 1, wherein the first network generates the request for handover.

5. A method as claimed in claim 1, wherein:
    the mobile station transmits to the second network data indicating that identification; and
    when the second call has been established the second network transmits to the first network data indicating that identification.

6. A method as claimed in claim 1, wherein the first network originates the second call.

7. A method as claimed in claim 6, wherein the mobile station transmits its identification in the second network to the first network and the first network uses that identification in originating the second call.

8. A method as claimed in claim 1, wherein the geographical coverage of the second network is greater than that of the first network.

9. A method as claimed in claim 1, wherein the first network is an IMT-2000 network.

10. A method as claimed in claim 1, wherein the second network is a PDC network.

11. A method as claimed in claim 1, wherein the first and second networks are cellular telephone networks.

12. A method as claimed in claim 1, wherein the mobile station is capable of communicating by radio with the first and second networks.

13. A method as claimed in claim 1, further comprising transmitting from the first network to the mobile station a confirmation message confirming that the second call has been established.

14. A method as claimed in claim 1, wherein the mobile station releases the first call responsive to receiving a confirmation message.

15. The method of claim 1 further comprising the second network being a different network from the first network.

16. The method of claim 1 wherein the identifier comprises a handover number assigned by the first network to the mobile station.

17. A method for performing handover of a mobile station communicating in a first call via a first network to communication in a second call via a second network, comprising:
   generating a request for a handover;
   establishing the second call between the first network and the mobile station via the second network;
   transferring data communication between the mobile station and the first network from the first call to the second call;
   wherein the mobile station originates the second call; and
   the first network transmits to the mobile station data indicating an identification for the handover;
   the mobile station transmits to the second network data indicating the identification; and
   when the second call has been established, the second network transmits to the first network data indicating the identification.

18. A mobile station for communicating in a first call with a first network and for communicating in a second call with a second network, the mobile station being arranged to:
   communicate data with the first network in the first call;
   determine that a handover is required;
   receive from the first network data indicating an identification of the handover operation, information that defines a handover number assigned by the first network to the handover;
   originate the second call with the first network via the second network; and
   transfer data communication with the first network from the first call to the second call.

19. A mobile station as claimed in claim 18, wherein the mobile station is arranged to transmit data indicating the identification to the second network.

20. A mobile station as claimed in claim 18, wherein the mobile station is arranged to release the first call with the first network responsive to data communication with the first network being transferred from the first call to the second call.

21. A mobile station as claimed in claim 18, wherein the mobile station is arranged to receive from the first network a confirmation message confirming that the second call has been established.

22. A mobile station as claimed in claim 21, wherein the mobile station is arranged to transfer data communication with the first network from the first call to the second call responsive to receiving the confirmation message.

23. The mobile station of claim 18 wherein the identifier comprises a handover number assigned by the first network to the handover.

24. A network element for performing handover of a mobile station from a first call via a first network to a second call via a second network, the network element forming part of the first network and being arranged to:
   communicate data with the mobile station via the first network in the first call;
   determine that a handover is required;
   transmit to the mobile station data indicating an identification of the handover operation, information that defines a handover number assigned by the first network to the handover;
   establish the second call with the mobile station via the second network; and
   transfer data communication with the mobile station from the first call to the second call.

25. A network element as claimed in claim 24, wherein the network element is arranged to receive from the second network data indicating an identification of the handover operation.

26. A network element as claimed in claim 24, wherein the network element is arranged to transmit a confirmation message to the mobile station responsive to receiving from the second network data indicating an identification of the handover operation.

27. A mobile station for communicating in a first call with a first network and for communicating in a second call with a second network, the mobile station comprising:
   means for communicating data with the first network in the first call;
   means for determining that a handover is required;
   means for receiving from the first network data indicating an identification of the handover operation, including information that defines a handover number assigned by the first network to the handover;
   means for originating the second call with the first network via the second network; and
   means for transferring data communication with the first network from the first call to the second call.

28. A network element for performing handover of a mobile station from a first call via a first network to a second call via a second network; the network element forming part of the first network and comprising:
   means for communicating data with the mobile station via the first network in the first call;
   means for determining that a handover is required;
   means for transmitting to the mobile station data indicating an identification of the handover operation, handover including information that defines a handover number assigned by the first network to the handover;
   means for establishing the second call with the mobile station from the first call to the second call.

* * * * *